United States Patent
D'Silva et al.

(10) Patent No.: US 11,681,504 B1
(45) Date of Patent: Jun. 20, 2023

(54) AUTOMATED APPLICATION BUILDER USING CONFIGURATION FILES

(71) Applicant: Opturo, Inc., Sarasota, FL (US)

(72) Inventors: Kenneth D'Silva, Sarasota, FL (US); Rocco Rinaldi, North Redington Beach, FL (US)

(73) Assignee: Opturo, Inc., Sarasota, FL (US)

( * ) Notice: Subject to any disclaimer, the term of this patent is extended or adjusted under 35 U.S.C. 154(b) by 217 days.

(21) Appl. No.: 16/857,622

(22) Filed: Apr. 24, 2020

Related U.S. Application Data

(60) Provisional application No. 62/839,300, filed on Apr. 26, 2019.

(51) Int. Cl.
| | |
|---|---|
| G06F 9/44 | (2018.01) |
| G06F 8/35 | (2018.01) |
| G06F 9/54 | (2006.01) |
| G06F 9/445 | (2018.01) |
| G06F 8/36 | (2018.01) |

(52) U.S. Cl.
CPC .................. *G06F 8/35* (2013.01); *G06F 8/36* (2013.01); *G06F 9/44505* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 5,740,431 A * | 4/1998 | Rail | G06F 9/44505 |
| | | | 713/1 |
| 6,016,394 A | 1/2000 | Walker | |
| 6,502,102 B1 | 12/2002 | Haswell et al. | |
| 6,662,357 B1 | 12/2003 | Bowman-Amuah | |
| 7,318,216 B2 | 1/2008 | Diab | |
| 7,644,390 B2 | 1/2010 | Khodabandehloo et al. | |
| 7,886,222 B2 | 2/2011 | Bagare et al. | |
| 7,917,890 B2 | 3/2011 | Barcellona | |
| 8,131,756 B2 | 3/2012 | Carus | |
| 8,245,183 B2 | 8/2012 | Iborra et al. | |
| 8,694,953 B2 | 4/2014 | Khodabandehloo et al. | |
| 8,977,693 B2 | 3/2015 | Gidugu | |
| 9,535,663 B2 | 1/2017 | Yaseen et al. | |
| 9,823,900 B2 | 11/2017 | Ouali | |

(Continued)

FOREIGN PATENT DOCUMENTS

| | | |
|---|---|---|
| AU | 2006315078 B2 | 2/2012 |
| EP | 1269321 B1 | 6/2008 |

(Continued)

*Primary Examiner* — Insun Kang
(74) *Attorney, Agent, or Firm* — Blueshift IP, LLC; Robert Plotkin

(57) ABSTRACT

A computer system enables users to create applications (such as web-based applications) easily by writing textual configuration files, which are automatically processed by the computer system to create a specific web-based application based on the configuration files. In particular, the computer system creates a data store layer, an application layer, and a user interface (UI) layer based on the configuration files. Users who do not have programming experience may write the configuration files. As a result, embodiments of the present invention enable non-programmers to create web-based applications easily and semi-automatically.

25 Claims, 9 Drawing Sheets

(56) References Cited

U.S. PATENT DOCUMENTS

| | | | |
|---|---|---|---|
| 10,001,975 | B2 | 6/2018 | Bharthulwar |
| 10,216,494 | B2 | 2/2019 | Stachura |
| 10,248,387 | B2 | 4/2019 | Bharthulwar |
| 10,303,441 | B2 | 5/2019 | Huebra |
| 2003/0093433 | A1 | 5/2003 | Seaman et al. |
| 2003/0172368 | A1* | 9/2003 | Alumbaugh ............. G06F 8/71 717/106 |
| 2004/0015832 | A1 | 1/2004 | Stapp et al. |
| 2004/0036719 | A1 | 2/2004 | Van Treeck |
| 2005/0165829 | A1 | 7/2005 | Varasano |
| 2009/0125892 | A1 | 5/2009 | Crewdson |
| 2015/0220572 | A1* | 8/2015 | Svarovsky ............ G06F 16/242 707/603 |
| 2016/0266895 | A1* | 9/2016 | Block ....................... G06F 8/71 |
| 2016/0337366 | A1* | 11/2016 | Wright ............... G06F 16/2358 |
| 2017/0357487 | A1* | 12/2017 | Balasubramanian ..... G06F 8/38 |
| 2018/0210709 | A1* | 7/2018 | Bharthulwar ............ G06F 8/24 |
| 2020/0019637 | A1* | 1/2020 | Barron-Kraus ..... G06F 16/2282 |
| 2020/0042291 | A1* | 2/2020 | Sung ......................... G06F 8/30 |
| 2021/0089336 | A1* | 3/2021 | Jaini ....................... G06F 9/541 |
| 2021/0208854 | A1* | 7/2021 | Mills ......................... G06F 8/38 |
| 2021/0303624 | A1* | 9/2021 | Sherman ................... G06F 8/34 |
| 2022/0012051 | A1* | 1/2022 | Bouley .................... G06F 8/76 |

FOREIGN PATENT DOCUMENTS

| | | |
|---|---|---|
| IN | 201717040449 | 1/2018 |
| JP | 2009193592 A | 8/2009 |
| WO | 2001077882 A1 | 10/2001 |
| WO | 2018236940 A1 | 12/2018 |

* cited by examiner

Account Returns & Market Values

This data template should include time series data of daily or month returns and market values, which are linked using each unique account ID Data Model Column Definition | ⊕ Add Custom Column

| Column Name | Account ID |
| Use Column | TRUE |
| Data Type | text (ASCII) |
| Is Null Value Allowed | FALSE |
| Maximum Text Length | DEFINED LENGTH |
| | 75 |

| Column Name | Account Value Date |
| Use Column | TRUE |
| Data Type | Date |
| Is Null Value Allowed | FALSE |

| Column Name | Currency Code |
| Use Column | TRUE |
| Data Type | text (ASCII) |
| Is Null Value Allowed | TRUE |
| Maximum Text Length | DEFINED LENGTH |
| | 2 |

| Column Name | Non-Fee Paying Accounts |
| Use Column | TRUE |
| Data Type | Numeric (Integer) |

| Column Name | Wrap Fee Accounts |
| Use Column | TRUE |
| Data Type | Numeric (Integer) |

| Column Name | Gross Return |
| Use Column | TRUE |
| Data Type | Numeric |
| Apply FX Return | |

⊘ Cancel    ☑ Save data model definition

Select a Data Model

Data Model Filter  [+] [−]

- 📁 [Demo Composite Reporting]
  - ⌂ Required
    - ☑ Account Returns & Market Values
    - 🗐 Composite Definition List
    - 🗐 Composite Membership List
  - ⌂ Optional
    - 🗐 Benchmark Definition List
    - 🗐 Benchmark Returns
- 📁 [Demo Return/Risk Analysis]
  - ⌂ Required
    - 🗐 Fund/Benchmark Definition List
    - 🗐 Investment Returns
  - ⌂ Required
    - 🗐 Blended Benchmark Generation
  - ⌂ Required
    - 🗐 Benchmark Investment Returns

Portfolio Selection

Global Equity Fund

Drilldown Group Selection

[Sector X] [Industry X]

Column Settings | Date Settings | Reporting Options

Custom Column Definition List

Custom Column ⓘ

Rollup Type ⓘ

Multi-Period Type ⓘ

| Custom Column | Rollup Type | Multi-Period Type |
|---|---|---|
| Weight (%) | Sum | Average |
| Return (%) | Arithmetic Weighted Average | Cumulative |
| Contribution | Sum | Cumulative Factor |
| Accrual | Sum | Sum |
| Market Value | Sum | Average |

Generate Report

Powered by opturo°

FIG. 5

AUTOMATED APPLICATION BUILDER USING CONFIGURATION FILES

BACKGROUND

Creating custom software applications, such as custom database applications, is tedious and time-consuming, and requires expertise in application programming. Writing a single sophisticated database application may take many person-days of time or more. Business owners and other users who are not experienced software developers cannot create such applications on their own, due to the need to write software code.

SUMMARY

A computer system enables users to create applications (such as web-based applications) easily by writing textual configuration files, which are automatically processed by the computer system to create a specific web-based application based on the configuration files. In particular, the computer system creates a data store layer, an application layer, and a user interface (UI) layer based on the configuration files. Users who do not have programming experience may write the configuration files. As a result, embodiments of the present invention enable non-programmers to create web-based applications easily and semi-automatically.

Other features and advantages of various aspects and embodiments of the present invention will become apparent from the following description and from the claims.

BRIEF DESCRIPTION OF THE DRAWINGS

FIG. 2 is a sample data model and customization screen according to one embodiment of the present invention;

FIG. 5 is a sample UI screen according to one embodiment of the present invention;

DETAILED DESCRIPTION

Software applications generated by embodiments of the present invention have three basic components:
- A data store layer that stores data used by the application. Often this is implemented using a third-party relational database or other proprietary data store.
- An application layer which processes data stored in the data store layer to produce output. The application layer may, for example, contain the business and/or analysis logic to generate output data and reports.
- A user interface (UI) layer for receiving input from and providing output to users of the application. For example, the UI layer may receive input from users and provide that input to the application layer. Conversely, the UI layer may provide output from the application layer to users.

As described above, traditionally creating a software application requires building the above three components from scratch. Creating a software application in this way requires skilled programmers, often involves inefficiently recreating elements of the above three components each time a new software application is designed, and increases system overhead and maintenance costs.

Figure 1:
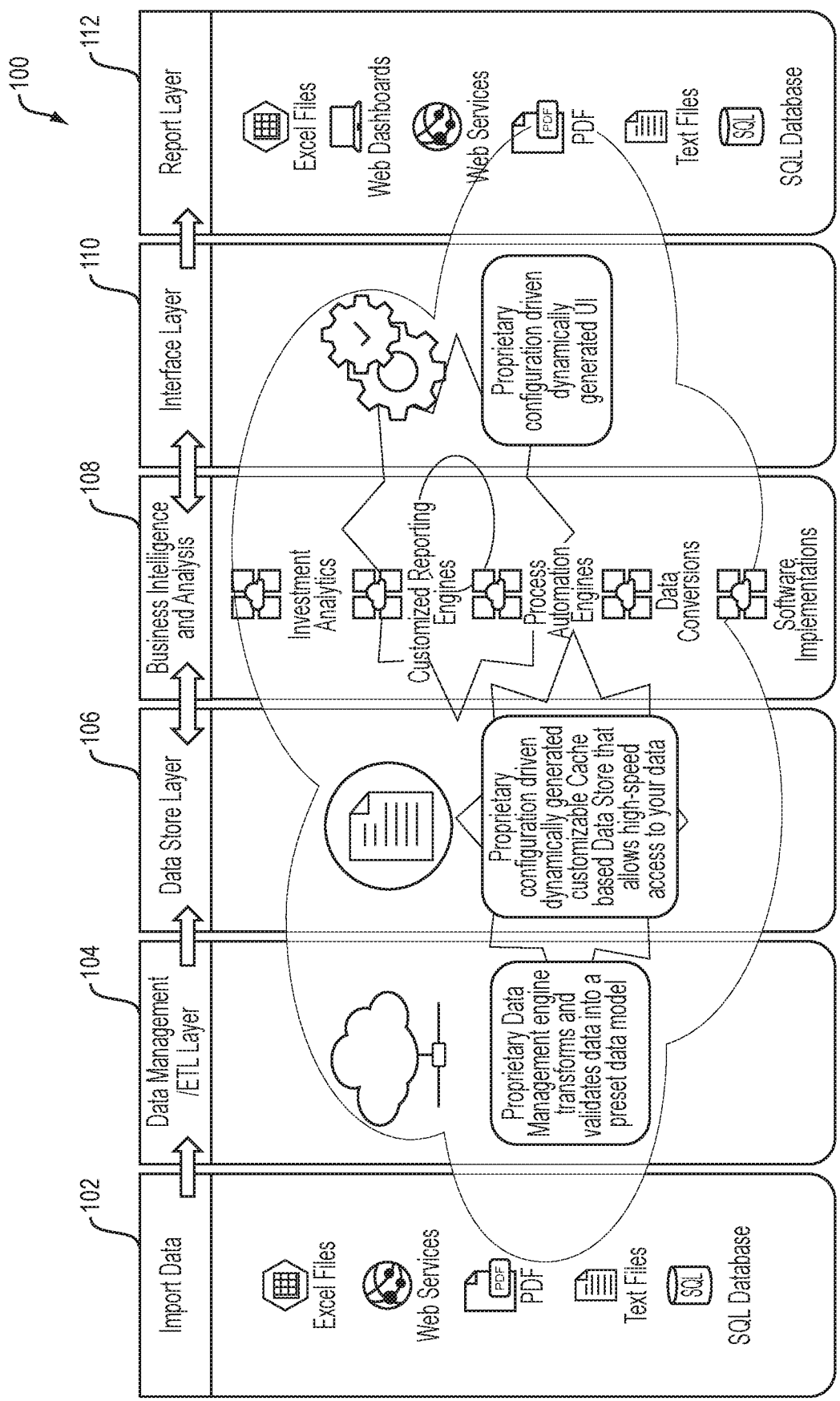
FIG. 1 is a diagram illustrating the architecture of a system for automatically generating a software application based on one or more configuration files according to an embodiment of the present invention.

Referring to FIG. 1, a diagram is shown of a system 100 for automatically generating a software application according to embodiments of the preset invention. The system 100 includes a data import layer 102, a data management layer 104, a data store layer 106, a business intelligence and analysis layer 108, an interface layer 110, and a report layer 112. The particular layers shown in FIG. 1 are merely examples. Certain embodiments of the present invention may not include all of the layers shown in FIG. 1. Similarly, certain embodiments of the present invention may include layers not shown in FIG. 1. For example, the data import layer 102 may not be part of the system itself; instead, the data import layer 102 may be outside of the system 100 and provide input to the system 100. Furthermore, layers shown in FIG. 1 may be combined in various ways.

The data import layer 102 includes one or more data sources containing data that may be received as input by the data management layer 104. The data import layer 102 may include, for example, spreadsheets (e.g., Microsoft® Excel® files), data obtained from web services, Adobe® Portable Document Format (Adobe® PDF®) files, text files (e.g., Microsoft® Word® files), and data contained in one or more databases. These are merely examples of data that may be contained in the data import layer 102. The data import layer 102 need not include all of the data shown in FIG. 1, and may include data not shown in FIG. 1.

The data management layer 104 may include ETL (extract, transform, and load) functionality, which enables users to source data from multiple systems in their native data and file formats. The data management layer 104 may be utilized to parse, transform, and enrich data that is persisted in the data store layer 106. The data management layer 104 provides seamless data upload capabilities directly from the user local file system or FTP Site or cloud.

The data store layer 106 includes one or more data models, which are defined by one or more text-based configuration files. Although the following description may refer to "a configuration file," it should be understood that one or more than one configuration file may be used. The configuration file may include text which defines features of the data model(s), such as cache data index type, key columns, column data types, and null/non-null. Embodiments of the present invention may, for example, render (generate) the data model, based on the definition in the configuration file, and store the resulting data model in, for example, one or more binary cache files in a file system or as an object type in a database. Alternatively, for example, the system 100 may render the data model on the fly.

The business intelligence and analysis layer 108 (also referred to as the "application layer") includes one or more data management and analytical modules that are configured to generate data and reports based on the data stored in the data store layer 106 and any other accessible data sources supported by the platform. Examples of such modules are described in more detail below. The icons shown within the business intelligence and analysis module 108 in FIG. 1 represent various functionality and/or use cases of the system 100, such as investment analytics, customized reporting, process automation, data conversions, and software implementations. These use cases are merely examples and do not constitute limitations of the present invention. Rather, the business intelligence and analysis layer 108 may or may not implement any of the particular uses cases/custom application shown in FIG. 1.

The user interface layer 110 automatically generates a user interface through which the application generated by the system 100 may provide output to one or more users, and through which that application may receive input from one or more users. The UI layer 110 may, for example, provide user output representing the output of the business intelligence and analysis layer 108. The configuration file mentioned above may define elements and layout of the UI layer, so that it is not necessary to code custom UI screens. Furthermore, users and third-party systems may provide input and receive output by making a web service call. The UI layer 100 may, additionally or alternatively, be adapted to receive input via an API, such as a web services API, from another application over a network. For example, the UI layer 100 may be adapted to receive input via an API (e.g., a web services API) automatically, e.g., without human input, from another application over a network.

Embodiments of the present invention may automatically generate a software application based on one or more configuration files. Certain embodiments of the present invention generate a software application based on two configuration files, namely a data store definition and an application process/UI definition. In general, the data store definition is used to generate the data store in the data store layer 106, and the application process definition is used to generate the elements of the business intelligence and analysis layer 108 and the UI layer 110.

Figure 6A:
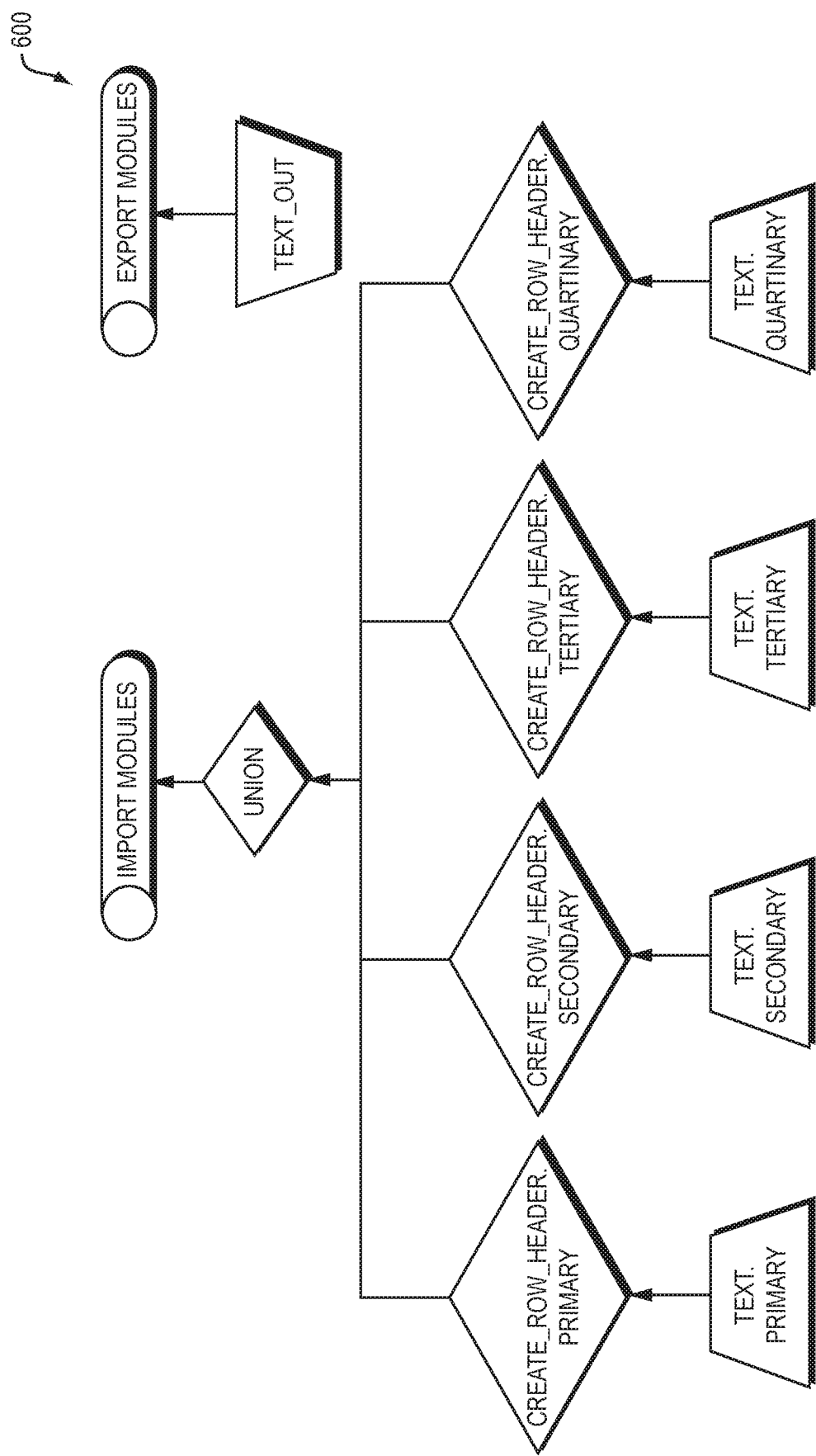
FIGS. 6A-6B are diagrams of applications generated according to embodiments of the present invention.

An example of a simple application, generated by the system 100 of FIG. 1, for performing a "union" operation is illustrated by the diagram in FIG. 6A. The application receives four text sources as input (illustrated as TEXT.PRIMARY, TEXT.SECONDARY, TEXT.TERTIARY, and TEXT.QUARTINARY), and uses four corresponding ETL modules (illustrated as CREATE_ROW_HEADER.PRIMARY, CREATE_ROW_HEADER.SECONDARY, CREATE_ROW_HEADER.TERTIARY, and CREATE_ROW_HEADER.QUARTINARY) to create row headers corresponding to the four text sources. The outputs of the ETL modules are provided as inputs to a Union module, which combines the four row headers into a single table.

Figure 6B:
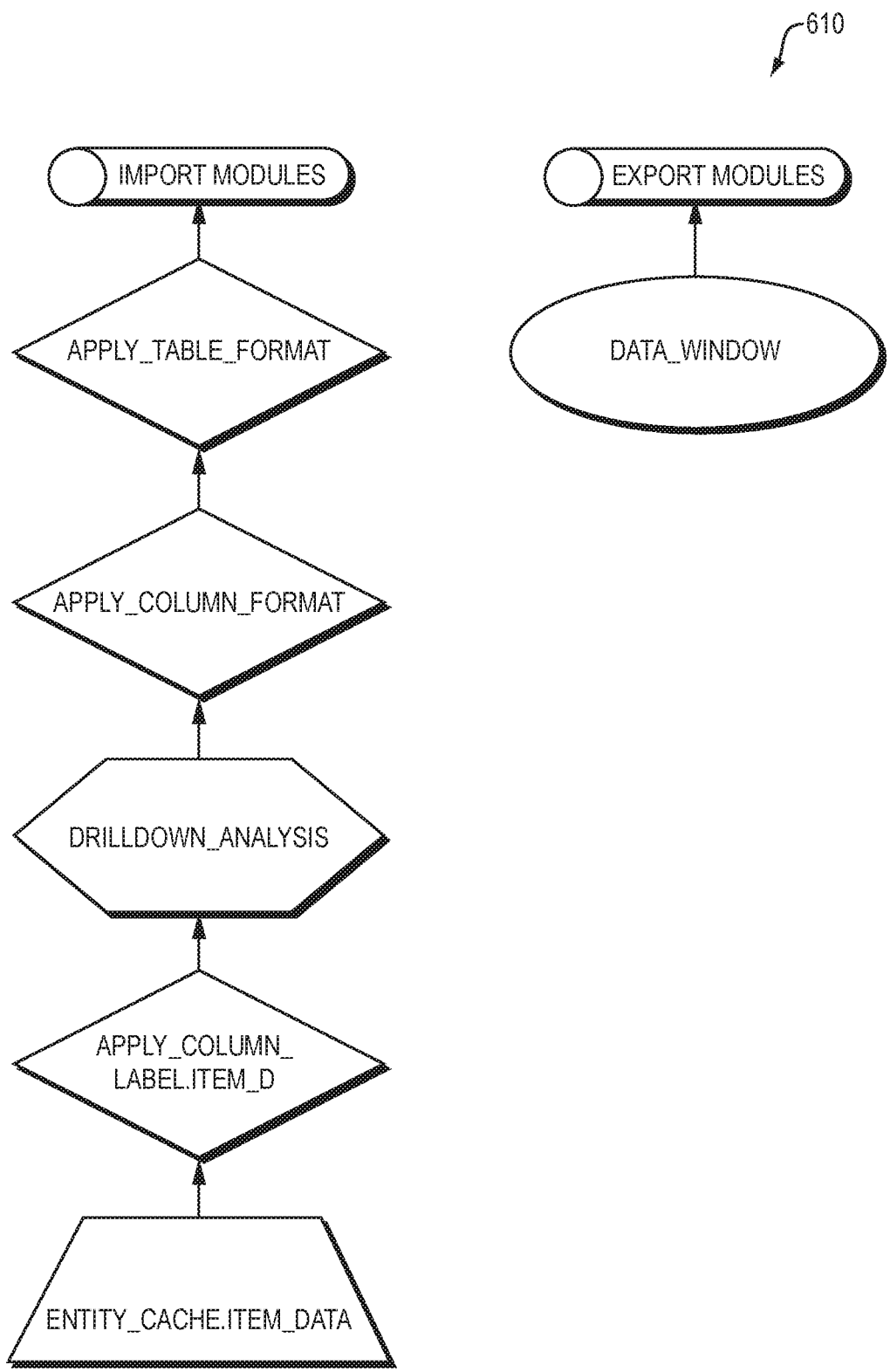

An example of another simple application, generated by the system 100 of FIG. 1, is shown in FIG. 6B. The application receives cache data as input (illustrated as ENTITY_CACHE.ITEM_DATA) into a function that applies column labels to the received cache data (illustrated as APPLY_COLUMN_LABEL.ITEM_D). The output of the column labeling function is provided as input to a drilldown analysis function, which performs a drilldown analysis on its input and provides the results of that analysis as output. This output is received as input by a column formatting function (illustrated as APPLY_COLUMN_FORMAT), which applies formatting to the columns of the analyzed data, and produces the resulting data as output. This output is received as input by a table formatting function (illustrated as APPLY_TABLE_FORMAT), which formats tables of data within the received data into output.

The applications represented by FIGS. 6A and 6B may be created using existing modules and configuration modules, without the need to write code.

More specifically, the data store definition may, for example, define a unique Optional Parameter Identifier List, which defines parameters that are common across all data models in the data store layer 106. The Optional Parameter Identifier List provides options for customizing each data model column. Examples of such options include:
  Use Column Option: True or False
  Data Type Options: Text (ASCII), Date, Numeric, Integer, Object
  Is Null Allowed: True or False
  Apply Factor Option: 1 or other factor to be applied when data is being persisted.
  Text Length Option: Number of allowable characters in Text (ASCII) data columns
  Multiple Perform Specific Pre-Analysis Conversion Option: True or False The data store definition may also define any one or more of the following:
  A unique Model Identifier
  A unique Application Identifier which is common to all Data Models for the Application.
  A Model Display Name
  An Application Cache Directory which is common to all Data Models for the Application.
  A Data Model Cache Directory
  A Table Index Type. Index Types include: By Date Index, By String Index, By String and Date Index, Attribute Index, No Index
  A unique Save Identifier for the system to persist user-defined settings related to the model
  A list of unique Column Identifiers for the Data Model
  For each Column Identifier: The Column Display Name
    Whether the column is customizable (True/False)
    Optional Parameter(s) related to Data Type
    Optional Parameter(s) related to Is Null Allowed
    Optional Parameter(s) related to Apply Factor
    Optional Parameter(s) related to Text Length
    Optional Parameter(s) related to Multiple Perform Specific Pre-Analysis Conversion
  Column Identifier(s) for indexing the cache data files
  Column Identifier(s) for indexing the data rows in each cache date file
  A list of Data Management Plug-in's for the Data Loading/Management Layer (SAYS ETL Module)
  A list of unique Platform Identifiers for Supported Data Files from third-party systems
  For each Platform Identifier:
    A Display Name
    A pre-customized Meta-Data Model File
    A list of unique Upload Identifiers for each of the types of Supported Data Files from third-party systems
    For each Upload Identifier:
      A Display Name
      A Pre-saved setting Report Name linked to the model's Save Identifier The application process definition may include data which defines a configuration setup. In certain embodiments of the present invention, the configuration setup includes three components: user input setting variables, a data download module, and a data upload module. The user setting variables define a list of one or more unique variable identifiers that may have one or more of the following attributes:
  Render Variable as GUI Setting: True/False
  Render GUI Setting under Tab Name
  Render GUI Setting under Tab—Group Name
  GUI Setting Input Type: This has the following options:
    Text Field Password Field
Date Field
Integer Field
Numeric Field
Long Text Field
Image Upload Field
Color Palette Field
Single File Path Field
Multi-File Path Field
Directory Path Field
Single Select Dropdown Field
Multi Select Dropdown Field
Optional Group Label Name: Renders multiple GUI Fields as One Group Setting Variable.
Max Character Count for Long Text Field
Preferred Dimensions for Uploaded Image Width & Height
Numeric and Integer Allowable Value Range
Defined Dynamic Date List for Date field
Help Link: Define either text or URL The data download module is used to source data from a data model and/or other sources, and to design a modular data flow that implements the specific business logic and/or analysis functionality of the application. The modular components may include, for example, an import module, a transform module, and an analysis module.

The import module is used to source data from the data model cache and other sources. The platform may scale to accommodate additional modules when an application needs a specific source that is not currently supported. Examples of sources include:

Entity Cache: This module is used to extract persisted model metadata and data for a given user, database and model identifier.

Text: This module is used to read data from text based files. It supports multiple file formats. The module can be used to read data from a single text file or from a series of text files that are date stamped (e.g data.20080101.txt, data20080102.txt, etc.). To read a series of text files that are date stamped, define the file directory, file prefix (e.g. data.), date range, frequency and format (e.g. yyyyMMdd) and file suffix (e.g. .txt).

Excel: This module is used to read data from Microsoft® Excel® files. VIA is based on Oracle® Java® and can run on any platform. It also supports reading from Microsoft® Excel® files on any platform. The module can be used to read data from a single Microsoft® Excel® file or from a series of Microsoft® Excel® files that are date stamped (e.g. data.20080101.xls, data20080102.xls, etc.). To read a series of Excel files that are date stamped, define the file directory, file prefix (e.g. data.), date range, frequency and format (e.g. yyyyMMdd) and file suffix (e.g. .xls).

Oracle: This module is used to read data from an Oracle® relational database. The data can be imported by using a query or procedure. Procedure or Query parameters can be defined in a setting or setting file. System will then execute the procedure or query for each set of parameter input.

Sybase: This module is used to read data from a Sybase® relational database. The data can be imported by using a query or procedure. Procedure or Query parameters can be defined in a setting or setting file. System will then execute the procedure or query for each set of parameter input.

SQLSERVER: This module is used to read data from a Microsoft® SQL Server® relational database. The data can be imported by using a query or procedure. Procedure or Query parameters can be defined in a setting or setting file. System will then execute the procedure or query for each set of parameter input.

DB2: This module is used to read data from a Microsoft® SQL Server® relational database. The data can be imported by using a query or procedure. Procedure or Query parameters can be defined in a setting or setting file. System will then execute the procedure or query for each set of parameter input.

MYSQL: This module is used to read data from an Oracle® MySQL® relational database. The data can be imported by using a query or procedure. Procedure or Query parameters can be defined in a setting or setting file. System will then execute the procedure or query for each set of parameter input.

Internal Data Set: Stores dataset internally between iterations

The transform module is used to transform, validate, and create a unified data set. The platform must scale to accommodate additional modules when an application needs a specific feature that is not currently supported. The list of modules within the transform module may include any one or more of the following:

Union: This module is used to join or merge two data sets or table sets. This module requires the row header and column headers to be defined for each table set being merged. For example, it could merge market data to a portfolio of securities. The first module in the above list would be the module that defines the portfolio of securities and the second module would define the market data table set. If the first data set has multiple table sets and the second data set has only one table set, then each table in the first data set will be merged to the table set in the second data set. If two data sets with multiple table sets are merged, then the program will merge the tables whose table labels match.

Apply Column Datatype: This module is used to assign column data types to all tables in a Data Set. The module can be used to edit the data types of columns. This can be useful when outputting to a SQL server or other database.

Apply Column Label: This module is used to assign column labels to all tables in a Data Set. The module can be used to add/edit column labels or headers.

Apply Column Format: This module is used to assign column formats for display in SAYS's Application Builder Grid.

Apply Table Format: This module is used to assign table formats and title for display in SAYS's Application Builder Grid.

Apply Table Label: This module is used to assign table labels to assigned table sets in a Data Set. The module can be used to add/edit table labels.

Case Series: This module is used to create case indexed table sets. It takes a single table set and splits it into multiple table sets based on the date column. This module is used to split a single data set with historical prices, into multiple table sets, where each table set contains data for one period.

Column Text: This module is used to perform text (String) manipulation operations on text value columns. For example, cut the first two characters (55) from the GICS code (e.g. 55104010) and convert it to a number. This module also contains the ability to replace with regex.

Covert Date Column: The module is used to convert a date to another date. For example, convert a date to the end of week or end of month date. There is also an offset functionality that can be used to add/subtract days/months/years to a date.

Create Row Header: This module is used to create the Row Header for the table set. For example, Row Headers are needed if the data set is to be merged with another data set using the Union module.

Data Comparison: This module is used to scrub and validate data. The module can also be used to create a true/false or I/O data column that corresponds to the match/not match data comparison.

Delete Column: This module is used to delete one or more columns of data.

Flip Table: This module is used to flip or pivot the data set. The table set should have defined row and column headers.

Format Date Column: This module is used to format a date column.

Format Number Column: This module is used to format a number column. It also allows you to specify a prefix or suffix.

Generate Attribute Data: Modules generates an attribute data set (Columns: Key Column, Start Date Column, End Date Column, Attribute Columns) off time series account or security time series data. For instance, track the change in sector, industry and country over a period of time.

Generate Unique List: This module is used to generate a unique list for a given column of data. The module can be used to generate a distinct list from string, date and numbers.

Groovy: This module allows you to write Groovy scripts to be used as part of the SAYS Process. They can be used as any type of module and allows for importing from a custom data source, writing a custom report, or doing a custom calculation. A groovy script should implement the interface com.opturo.api.GroovyTransformInterface from the SAYS API.

H2 SQL: This module allows you to manipulate VIA data using SQL commands.

Insert Data Column: This module is used to either create a new data set (one table set) or inserts data columns into an existing data set.

Insert Index Column: This module is used to create an index column with unique values. The column could be used as an identifier column for the data set.

Insert Row Header Data Column: This module is used to insert the row header as a data column within the data set.

Insert Table Label Data Column: This module is used to insert the table label as a data column within the data set.

Move Data Column: This module is used to move one or more data columns.

Parse Date Text Column: This module is used to convert a formatted date text column to a date column.

Retrieve Row: This module is used to retrieve a list of defined data rows.

Retrieve Column: This module is used to retrieve a list of defined data columns.

Retrieve Table: This module is used to retrieve a list of table sets.

Sort Column: This module is used to sort the data in a table set. It has multi-sort capabilities.

Time Series: This module is generally used to create time indexed table sets. It takes a single table set and splits it into multiple table sets based on the identifier or group column. This module is used to split a single data set with historical prices, into multiple table sets, where each table set contains data for one identifier.

Analysis Module: These modules are used to incorporate the application specific business logic and/or analysis. The platform must scale to accommodate additional modules when an Application needs a specific feature that is not currently supported. The list includes the following:

Column Arithmetic: This module is used to perform arithmetic operations on defined column or columns. For example, adding/multiplying two or more columns, subtracting one column from another or adding a constant value to every value in a column.

Table Arithmetic: This module is used to perform arithmetic operations on single columns within a table. For example, sum values in a column, average values in a column, calculate the standard deviation of values in a column, calculate the standard deviation of values in a column or calculate correlation between values in two columns.

Cross Period Calculation: This module is used to calculate the return of an instrument or portfolio from period T to T+1.

Data Upload Module: These modules are used to deliver data and analysis to the end-user of the application. The list includes the following:

JSON Out: This module is used to output data to the SAYS HTML Grids. Data from this window can be exported to Excel or Text.

Custom Report Out: This module is used to export data to a custom output source. It can be leveraged to export analysis data to a PDF/EXCEL/HTML customized report.

Internal Data Set Out: Stores dataset internally between iterations.

Each configuration file may be registered with an embodiment of the present invention. Such registration involves creating a unique Registration Identifier and defining a variety of attributes, such as one or more of the following:

Display Name
Application Group
Permissioned User List
Configuration File Location
Output Type: Following are the list of options:
  No display
  Data Grid
  File
Unique Save Identifier: To persist User Input Settings
Application Identifier
Required Model Identifier List
Optional Model Identifier List The data management/ETL layer 104 may include, for example, any one or more of the following components:

Import Source Data Upload Component: This provides the application user with the ability to upload data from various sources including:

Local Computer: Provides a dialog box to select one or many Text or Excel files from the user's local or network drives FTP Site: Allows user to provide credentials and connect to any FTP site. Once connected, users are provided with a dialog box that allows them to browse the FTP site and select files for Upload Database: Allows user to connect to four different relational databases and then execute a query and upload its results.

Web Services: Allows user to define a REST Web Service URL and upload its results.

ETL Component: Includes the two following sub-components:

File Format Settings: Includes the following elements:
  File Delimiter: Supports Tab, Semicolon, Comma, Space, Pipe and custom delimiters
  Has Column Header: True/False
  Start Row Value
  End Row Value: Leave blank for system to find last row
  Start Column Value
  End Column Value
  Text Qualifier: Leave blank if no text qualifier exists ETL Settings: Includes the following elements:
  Data Management Plug-in: List of pre-configured data processes for parsing and validating specific third-party data files.
  Map Column: Interface to Map Uploaded Columns Headers to the Data Model Columns. Options to specify Data Type and Date Format
  Add Column: Add new columns under the following operational types:
    Assign Value: Provide a static value and data type
    Extract Value from File/Sheet Name: Ability to provide prefix, suffix and Regex expressions for the system to parse a text for information
    Multi-Column Operation: Add a new column using the following operations on existing columns:
      Addition
      Subtraction
      Multiplication
      Division
      Inverse Value
    Create Index: Creates an index column starting at 1 with increments of 1
  Filter Data: Interface to define series of "Where Clauses" that will filter out records. The following elements are used to define a "Where Clause"
    Clause Type: OR/AND
    Data Column
    Data Type
    Operation includes the following:
      Equal To
      Less Than
      Less Than Equal To
      Greater Than
      Greater Than Equal To
      Not Equal To
      Between
      Not Between
      Is Missing
      Not Missing
    Comparison Type: Value/Column
    Comparison Value
    Comparison Column
  Validate Data: Interface to define series of "Validation Rules" that will perform a data validation operation on selected records. The "Validation Rules" has two components:
    Where Clause Component: The following elements are used to define a "Where Clause"
      Clause Type: OR/AND
      Data Column
      Data Type
      Operation includes the following:
        Equal To
        Less Than
        Less Than Equal To
        Greater Than
        Greater Than Equal To
        Not Equal To
        Between
        Not Between
        Is Missing
        Not Missing
      Comparison Type: Value/Column
      Comparison Value
      Comparison Column
    Validation Component: The following elements are used to define a "Validation Rule"
      Validation Operation includes the following:
        Replace Value
        Fetch Value
        Multiply Factor
      Validation Column
      Validation Value
      Fetch Column
  SQL Engine: Provides an interface to allow users to input custom SQL statements to further filter, transform and validate the uploaded data.
  Data Merge Options: Includes the following options:
    Merge Static Data to Loaded Time Series Data
    Merge Time Series Data to Loaded Folder Indexed Time Series Data
    Generate Unique Start and End Date Attribute Data From Time Series Data
  Union Operation: Merge multiple synchronically uploaded data to current.

Referring to FIG. 2, a sample data model and customization screen 200 is shown. The screen 200 may be used to receive user input which defines one or more columns of the data stored in the data store layer 106. The particular number and names of columns shown in FIG. 2 are merely examples and do not constitute limitations of the present invention.

Figure 3:
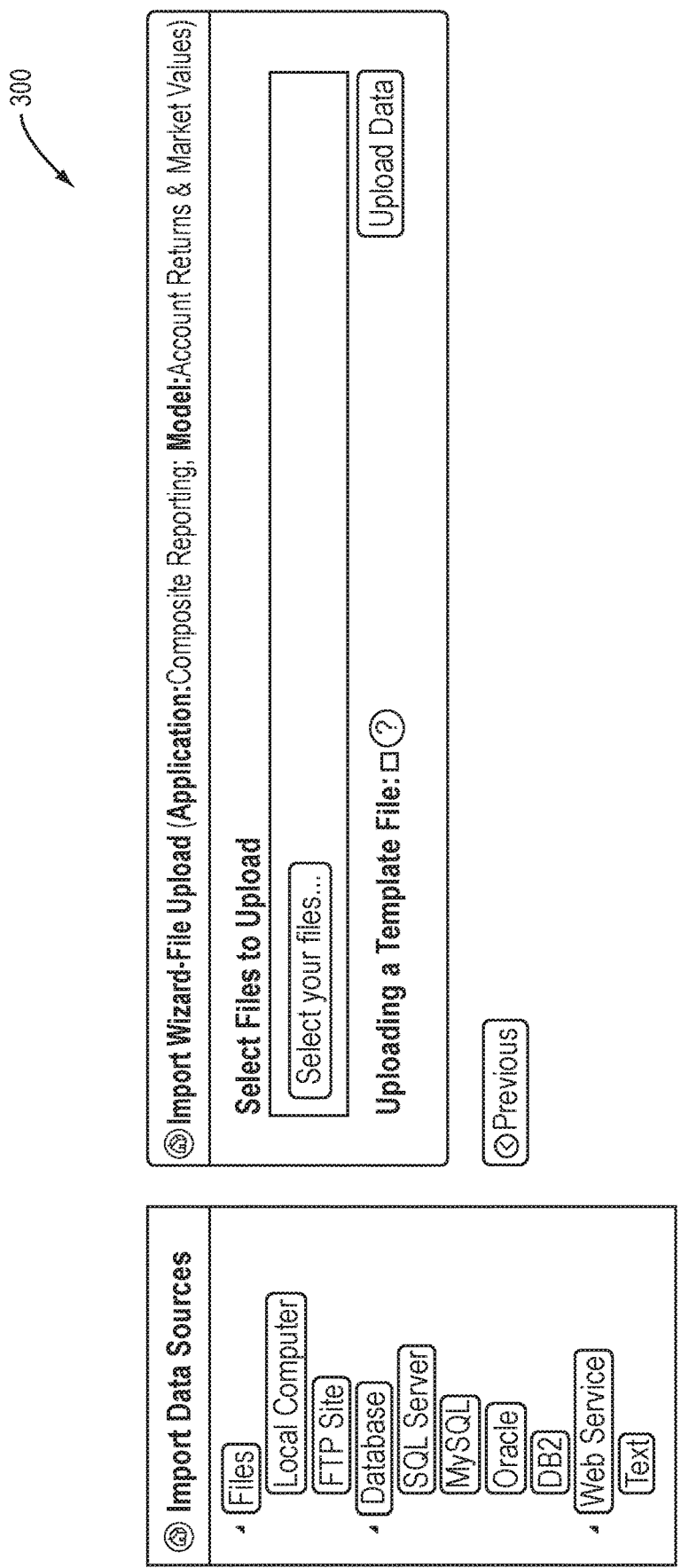
FIG. 3 is a sample data import screen according to one embodiment of the present invention.

Referring to FIG. 3, a sample data import screen 300 is shown. As shown in FIG. 3, the user may select from among a plurality of available import data sources, such as one or more files (e.g., on a local computer or an FTP site), one or more databases (e.g., Microsoft® SQL server, Oracle® MySQL®, Oracle®, or IBM® DB2 databases), and one or more web services (e.g., a text web service). The user may select a particular data source and then click on "Upload Data" to upload data from the selected data source into the data management layer 104.

Figure 4:
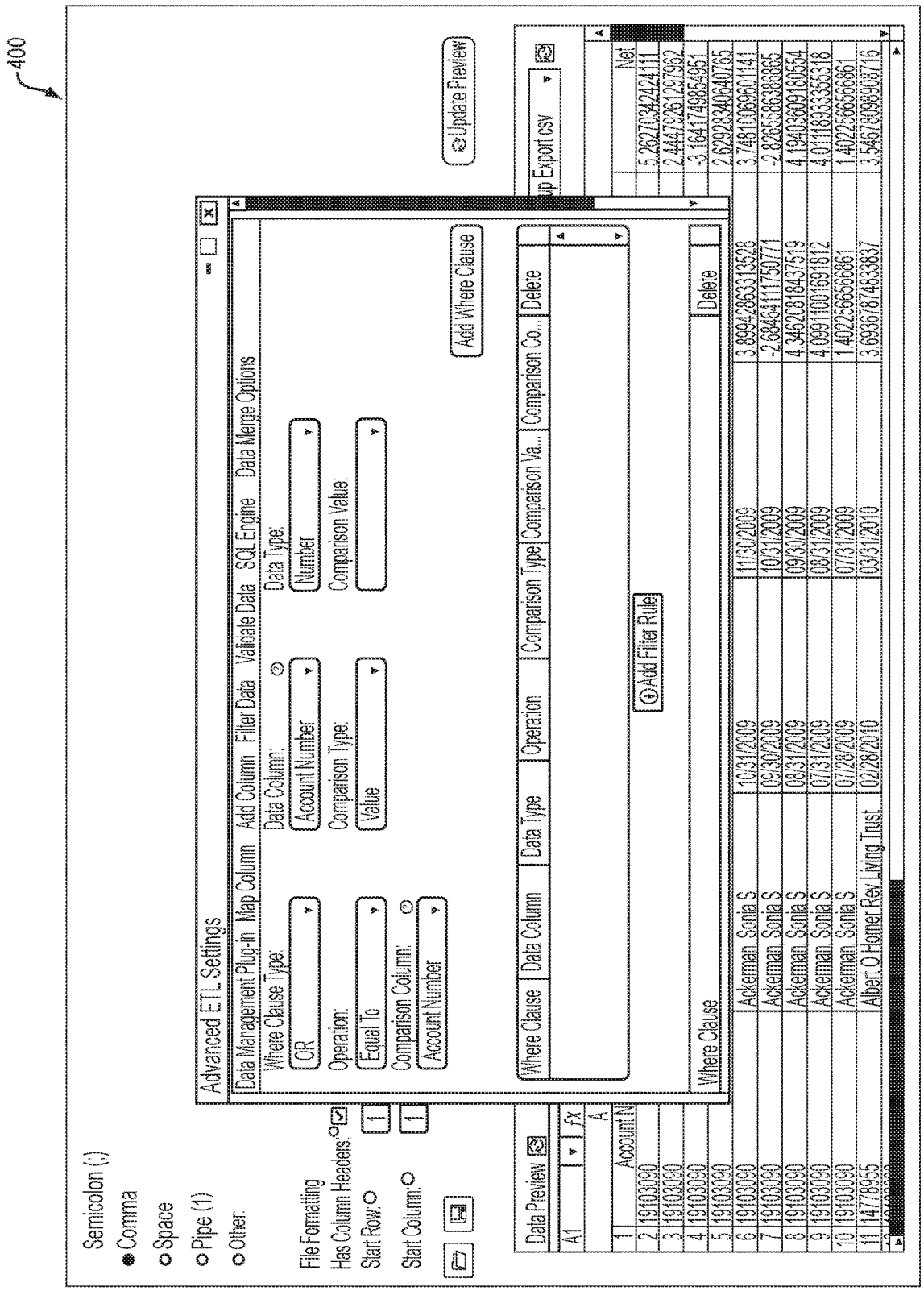
FIG. 4 is a sample ETL screen according to one embodiment of the present invention.

Referring to FIG. 4, a sample ETL screen 400 is shown. A user may use the screen 400 to set any of a variety of ETL settings to be used by the data management/ETL layer 104 to import and perform ETL on the data in the import layer 102. The particular settings shown in FIG. 4 are merely examples and do not constitute limitations of the present invention.

Referring to FIG. 5, a sample UI screen 500 is shown. The UI screen 500 shown in FIG. 5 is merely an example of a UI screen that may be displayed by the interface layer 110 to perform the functions disclosed herein, and does not constitute a limitation of the present invention.

Embodiments of the present invention are directed to a computer system which significantly reduces the time, effort, and skill required to create a software application by automating aspects of the application creation process and by enabling applications to be created based on inputs which do not necessarily require programming expertise to create. In particular, embodiments of the present invention enable applications to be created based on configuration files, rather than based on program code. Such embodiments automatically generate an application (such as its data store layer, application layer, and/or UI layer) based on such configuration files. Embodiments of the present invention may be used to create any kind of application, but are particularly well-suited for creating remote (e.g., hosted, web-based, or cloud-based) applications.

An example of a configuration file that defines a data model is attached as Appendix A, named dataModelDefinition.cfg. This configuration file, which is referred to as "the example data model definition" below, is merely an example of a configuration file that may be used to define an example data model, and is not a limitation of the present invention. As shown therein, the configuration file defines a variety of data in the data model. Certain examples of definitions will be described herein for illustrative purposes.

The example data model definition includes statements of the form "X=Z". Such statements define a data structure X, and indicate that the value Z should be assigned to the data X. When embodiments of the present invention process the example configuration file to generate the application, they may read such an assignment statement and, in response, create the defined data structure X (if it does not already exist) within the data store layer 106 and assign a value of Z to the data structure X. This process may be repeated for any number of assignment statements within the example data model definition.

The example data model definition uses a particular delimiter to indicate a sub-structure of a data structure. In the example data model definition, that delimiter is a period, but may be any character or characters. For example, the example data model definition includes the statement "VIA.SAYS_PLATFORM.ENTITY_CODE=SAYS". This indicates that a data structure named VIA should be created to have a substructure named SAYS_PLATFORM, which in turn should be created to have a substructure named ENTITY_CODE, and that the resulting data structure should be assigned a value of SAYS. Data structures having any kind of nested structures may be defined in this way. When embodiments of the present invention process the example configuration file to generate the application, they may read such a nested data structure definition and create a corresponding nested data structure (such as a data structure named ENTITY_CODE, nested within a data structure named SAY_PLATFORM, nested within a data structure named VIA), and then assign the specified value (in this example, SAYS) to the resulting data structure.

As may be seen from the example data model definition, the example data model definition includes a plurality of data structure definitions. When embodiments of the present invention process the example data model definition to create an application, they may process each such data structure definition and create a data structure described by the data structure definition and assign, to that data structure, the value described by the data structure definition. In this way, a plurality of data structures may be created within the data store layer 106 and assigned corresponding values.

Data structure definitions within the example data model definition may define lists in any of a variety of ways, such as by separating elements in a list by a delimiter, such as a semi-colon or other character. For example, the text "1;5;7;4" defines a list containing the values 1, 5, 7, and 4, in that order. When embodiments of the present invention process the example data model definition to create an application, they may process each such list definition and create a list containing the elements specified by the list definition.

The example data model definition may specify that values of any of a variety of types should be assigned to data structures, such as integers, floating point numbers, strings, and lists of any such data types.

An example of a configuration file that defines an application layer (e.g., the business intelligence and analysis layer 108) and a user interface layer (e.g., the user interface layer 110) is attached as Appendix B, named analysisReportingApplicationDefinition.cfg. This configuration file, which is referred to as "the example application definition" below, is merely an example of a configuration file that may be used to define an example application layer and user interface layer, and is not a limitation of the present invention.

The example application definition includes a variety of statements that assign values to parameters of software modules. For example, the statement "RETRIEVE_COLUMN.PORTFOLIO_LIST.IN_LIST_ORDER=true" assigns a value of "true" to a parameter named "PORTFOLIO_LIST.IN_LIST_ORDER" of a software module named "RETRIEVE_COLUMN." When embodiments of the present invention process the example application definition to create an application, they may process such a statement by passing the specified parameter value (e.g., true) to the specified parameter (e.g., PORTFOLIO_LIST.IN_LIST_ORDER) of the specified software module (e.g., PORTFOLIO_LIST). Each of a plurality of parameter assignment statements may be processed in this way to assign a plurality of values to a plurality of parameters of a plurality of software modules.

The example application definition may specify that the output of one software module is to be used as the input to another software module. For example, the statement, "RETRIEVE_COLUMN.PORTFOLIO_LIST.INPUT_MODULE=ENTITY_CACHE.PORTFO LIO_LIST" specifies that the output of the software module "ENTITY_CACHE.PORTFOLIO_LIST" is to be provided as input to the software module "RETRIEVE_COLUMN.PORTFOLIO_LIST.INPUT_MODULE." When embodiments of the present invention process the example application definition to create an application, they may link the two specified software modules such that the output of one (e.g., ENTITY_CACHE.PORTFOLIO_LIST) is to be provided as an input to the other (e.g., RETRIEVE_COLUMN.PORTFOLIO_LIST.INPUT_MODULE).

The example application definition may include statements which refer to externally-defined software modules (i.e., software modules which are not defined by the example application definition). For example, the "UNION" software module is not defined within the example application definition, but is referred to by statements in the example application definition. The "UNION" software module may be used to generate a data structure which is the union of the inputs to the "UNION" software module. An example of a statement in the example application definition which refers to the "UNION" software module is "UNION.CUSTOM_COL_LIST.INPUT_MODULE_LIST=CREATE_ROW_HEADER.CUSTO M_COL_LIST;CREATE_ROW_HEADER.WT_VAL;CREATE_ROW_HEADER.RET_VAL."

Figure 7A:
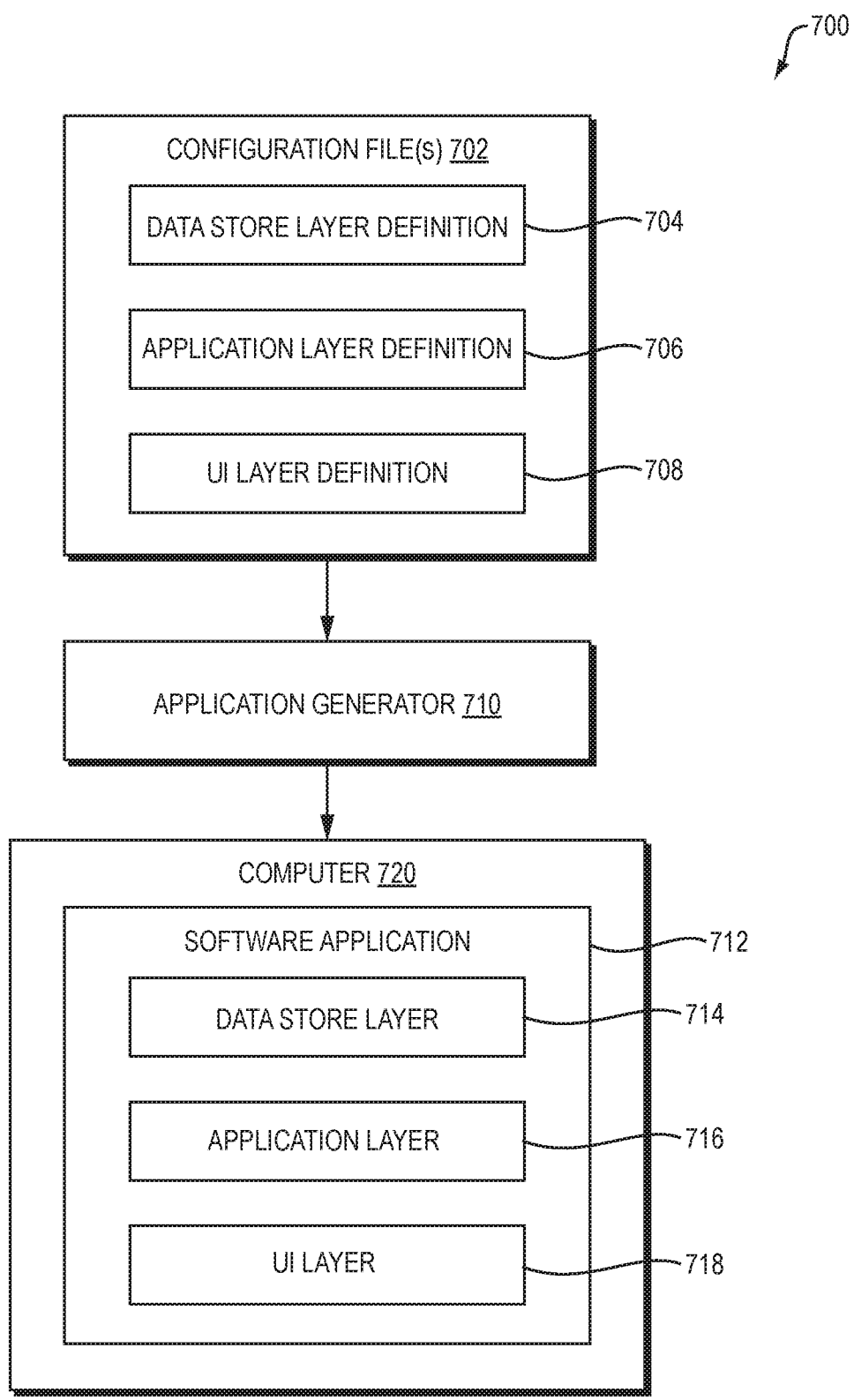
FIG. 7A is a dataflow diagram of a computer system for automatically generating a software application according to one embodiment of the present invention.
Figure 7B:
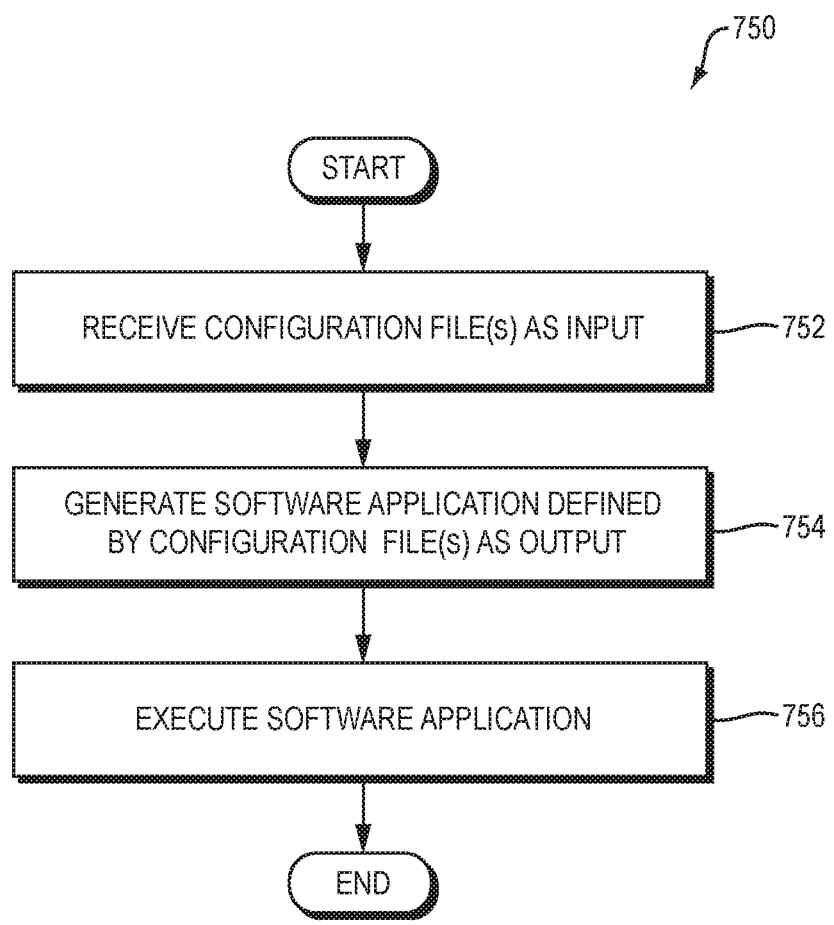
FIG. 7B is a flowchart of a method performed by the system of FIG. 7A according to one embodiment of the present invention.

Referring to FIG. 7A, a dataflow diagram is shown of a computer system 700 for automatically generating a software application according to one embodiment of the present invention. Referring to FIG. 7B, a flowchart is shown of a method 750 performed by the system of FIG. 7A according to one embodiment of the present invention.

The method 750 includes: (1) at an application generator 710, receiving at least one configuration file 702 comprising: text 704 defining a data store layer 714, text 706 defining an application layer 716, and text 708 defining a user interface layer 718 (FIG. 7B, operation 752); and (2) at the application generator 710, automatically processing the at least one configuration file 702 to create a software application 712 comprising: the data store layer 714, comprising data defined by the text 704 defining the data store layer 714; the application layer 716, comprising computer program instructions, executable by a computer processor to receive data from the data store layer 714 to produce application output, wherein the application layer is defined by the text 706 defining the application layer 716; and the user interface layer 718, comprising user interface elements defined by the text 708 defining the user interface layer 718 (FIG. 7B, operation 752).

The application generator 710 may store the software application in a non-transitory computer-readable medium of a computer 720. The application generator 710 may be a software application which executes on a computer, such as the computer 720.

The configuration file(s) 702 may include one or more files. For example, the configuration file 702 may consist of a single file containing the data store layer definition 704, application layer definition 706, and UI layer definition 708. As another example, the configuration file 702 include a file containing the data store layer definition 704, a distinct file containing the application layer definition 706, and yet another distinct file containing the UI layer definition. As yet another example, the configuration file 702 may include a file containing the data store layer definition 704 and a distinct file containing both the application layer definition 706 and the UI layer definition 708. The configuration file(s) 702 may, for example, solely consist of text.

The method 750 may further include: (3) executing, by the computer 720, the software application 712 to: (a) receive input; (b) provide the received input to the application layer 716; and (c) process the input, using the application layer 716, to produce output (FIG. 7B, operation 756). The method 750 may, for example, also use the UI layer 718 to provide the output to a user, e.g., via an output device such as a monitor and/or speakers. The received input may, for example, be any one or more of the following, in any combination: user input from a user via the user interface layer 718, data received from the data store layer 714, and input received from another software application via an API (e.g., a web services API over a network).

The data store layer 714 may, for example, include at least one data model, and creating the data store layer may include, at a data management layer, importing data from a data import layer into the at least one data model of the data store layer. The data import layer may, for example, include at least one of a spreadsheet, data obtained from web services, PDF files, text files, and data in a database. Importing the data may include, for example, using extract, transform, and load (ETL) functionality to import the data.

The configuration files may, for example, define a plurality of features of the at least one data model, and creating the data store layer may include creating a plurality of data structures having the plurality of features in the data store layer.

Embodiments of the present invention have a variety of unexpected benefits and advantages. For example, embodiments of the present invention enable software applications to be created without any knowledge of how to write software code. For example, configuration files implemented according to embodiments of the present invention may be written by people who do not have any programming experience.

One or more configuration files implemented according to embodiments of the present invention (such as some or all of the configuration files 702) may contain, or consist solely of, statements that assign values to parameters of existing software modules. As a result, embodiments of the present invention, such as the application generator 710, may generate a software application (such as the software application 712) solely by assigning values to parameters of existing software modules, as specified by the assignment statements in the configuration file(s) 702. As this implies, embodiments of the present invention (e.g., the application generator 710) may generate a software application (e.g., the software application 712) without compiling any source code into executable code, but instead solely by assigning values to parameters of existing software modules. This significantly simplifies the process of generating the software application. The resulting software application, which includes software modules having parameter values that were assigned based on the assignment statements in the configuration file(s), may then be executed.

Configuration files implemented according to embodiments of the present invention (e.g., some or all of the configuration file(s) 702) may lack conditional statements (e.g., if-then statements). As this implies, embodiments of the present invention (e.g., the application generator 710) may generate a software application (e.g., the software application 712) based solely on one or more configuration files (e.g., the configuration file(s) 702) which do not contain any conditional statements. This is one example of a way in which embodiments of the present invention enable software applications to be generated based on configuration files which may be written by people who do not have knowledge of how to write traditional computer source code. Any conditional logic executed by a software application generated by embodiments of the present invention (e.g., the software application 712) may be executed by one or more existing software modules having parameters whose values were assigned by assignment statements in the configuration file(s) 702.

Similarly, configuration files implemented according to embodiments of the present invention (e.g., some or all of the configuration file(s) 702) may lack loop statements (e.g., for statements, while statements, do-while statements, and do-until statements). As this implies, embodiments of the present invention (e.g., the application generator 710) may generate a software application (e.g., the software application 712) based solely on one or more configuration files (e.g., the configuration file(s) 702) which do not contain any loop statements. This is one example of a way in which embodiments of the present invention enable software applications to be generated based on configuration files which may be written by people who do not have knowledge of how to write traditional computer source code. Any loops executed by a software application generated by embodiments of the present invention (e.g., the software application 712) may be executed by one or more existing software modules having parameters whose values were assigned by assignment statements in the configuration file(s) 702. As the above examples imply, some or all of the configuration file(s) 702 may lack both conditional statements and loop statements.

Furthermore, as the above description implies, embodiments of the present invention may generate and execute a complete software application, which includes a data store layer, an application layer, and a UI layer, all of which were generated solely by assigning values to parameters of existing software modules, and without compiling any source code into executable code.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may automatically generate a software application based on configuration files and data from the import layer 102 in the manner disclosed herein. Such automatic generation of a software application based on configuration files cannot be performed manually or mentally by a person and constitutes an improvement to computer technology.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor executing computer program instructions stored on at least one non-transitory computer-readable medium, the method comprising:
   (1) receiving at least one configuration file comprising: text defining a data management layer; text defining table identifiers, table types, column identifiers, and column data types in a data store layer; text defining an application layer; text defining a report layer; and text defining a user interface layer; and
   (2) automatically processing the at least one configuration file to create a software application comprising:
      the data management layer, comprising computer program instructions, executable by a computer processor to perform ETL (extract, transform, and load) functions, the ETL functions comprising: (1) receiving data from a plurality of systems in native data and file formats of the plurality of systems; (2)

extracting, transforming, and loading the data received from the plurality of systems into the data store layer;

the data store layer, comprising data defined by the text defining the data store layer, wherein the data in the data store layer has the table identifiers, table types, column identifiers, and column data defined by the configuration file;

the application layer, comprising computer program instructions, executable by the computer processor to receive data from the data store layer to produce application output, defined by the text defining the application layer;

the report layer, comprising computer program instructions, executable by the computer processor to generate reports based on: (1) the data in the data store layer, and (2) the application layer; and the user interface layer, comprising user interface elements defined by the text defining the user interface layer.

2. The method of claim 1, further comprising:
(3) executing the software application to:
   (a) receive user input via the user interface layer; and
   (b) provide the user input to the application layer; and
   (c) process the user input, using the application layer, to produce output.

3. The method of claim 2, wherein
(3) further comprises:
   (d) using the user interface layer to provide the output produced in (3)(c) to the user.

4. The method of claim 1, further comprising:
(3) executing the software application to:
   (a) receive input via a web service API; and
   (b) provide the input to the application layer; and
   (c) process the input, using the application layer, to produce output.

5. The method of claim 1, wherein the at least one configuration file solely contains text.

6. The method of claim 1, wherein the data store layer comprises at least one data model, and wherein creating the data store layer comprises, at a data management layer:

rendering the at least one data model based on the text defining the table identifiers, table types, column identifiers, and column data types in the data store layer; and importing data from a data import layer into the at least one data model of the data store layer.

7. The method of claim 6, wherein the data import layer is at least one of a spreadsheet, data obtained from web services, Adobe® Portable Document Format (Adobe® PDF®) files, text files, and data in a database.

8. The method of claim 7, wherein importing comprises using extract, transform, and load (ETL) functionality to import the data.

9. The method of claim 1, wherein the at least one configuration file defines a plurality of features of at least one data model, and wherein creating the data store layer comprises creating a plurality of data structures having the plurality of features in the data store layer.

10. The method of claim 1, wherein the at least one configuration file comprises a first configuration file defining a data store and a second configuration file defining the application layer and the user interface layer.

11. The method of claim 1, wherein the text defining the data store layer defines:
a plurality of data models; and
a unique Optional Parameter Identifier List, which defines parameters that are common across all of the plurality of data models.

12. The method of claim 1, wherein the at least one configuration file consists of assignment statements which assign values to parameters of existing software modules.

13. The method of claim 12, wherein the at least one configuration file does not contain any conditional statements.

14. The method of claim 13, wherein the at least one configuration file does not contain any loop statements.

15. The method of claim 1, wherein automatically processing the at least one configuration file to create the software application comprises assigning values to parameters of existing software modules, and does not include compiling any source code into executable code.

16. A system comprising at least one non-transitory computer-readable medium having computer program instructions stored thereon, the computer program instructions being executable by at least one computer processor to perform a method, the method comprising:
(1) receiving at least one configuration file comprising: text defining a data management layer; text defining table identifiers, table types, column identifiers, and column data types in a data store layer; text defining an application layer; text defining a report layer; and text defining a user interface layer; and
(2) automatically processing the at least one configuration file to create a software application comprising:

the data management layer, comprising computer program instructions, executable by a computer processor to perform ETL (extract, transform, and load) functions, the ETL functions comprising: (1) receiving data from a plurality of systems in native data and file formats of the plurality of systems; (2) extracting, transforming, and loading the data received from the plurality of systems into the data store layer;

the data store layer, comprising data defined by the text defining the data store layer, wherein the data in the data store layer has the table identifiers, table types, column identifiers, and column data defined by the configuration file;

the application layer, comprising computer program instructions, executable by the computer processor to receive data from the data store layer to produce application output, defined by the text defining the application layer;

the report layer, comprising computer program instructions, executable by the computer processor to generate reports based on: (1) the data in the data store layer, and (2) the application layer; and the user interface layer, comprising user interface elements defined by the text defining the user interface layer.

17. The system of claim 16, wherein the method further comprises:
(3) executing the software application to:
   (a) receive user input via the user interface layer; and
   (b) provide the user input to the application layer; and
   (c) process the user input, using the application layer, to produce output.

18. The system of claim 17, wherein (3) further comprises:

(d) using the user interface layer to provide the output produced in (3)(c) to the user.

19. The system of claim 16, wherein the method further comprises:
(3) executing the software application to:
(a) receive input via a web service API; and
(b) provide the input to the application layer; and
(c) process the input, using the application layer, to produce output.

20. The system of claim 16, wherein the at least one configuration file solely contains text.

21. The system of claim 16, wherein the data store layer comprises at least one data model, and wherein creating the data store layer comprises, at a data management layer:
rendering the at least one data model based on the text defining the table identifiers, table types, column identifiers, and column data types in the data store layer; and
importing data from a data import layer into the at least one data model of the data store layer.

22. The system of claim 21, wherein the data import layer is at least one of a spreadsheet, data obtained from web services, Adobe® Portable Document Format (Adobe® PDF®) files, text files, and data in a database.

23. The system of claim 22, wherein importing comprises using extract, transform, and load (ETL) functionality to import the data.

24. The system of claim 16, wherein the at least one configuration file defines a plurality of features of at least one data model, and wherein creating the data store layer comprises creating a plurality of data structures having the plurality of features in the data store layer.

25. The system of claim 16, wherein the at least one configuration file comprises a first configuration file defining a data store and a second configuration file defining the application layer and the user interface layer.

* * * * *